3,423,736
APPARATUS FOR READING INFORMATION SELECTIVELY FROM STORAGE DEVICES
William W. Ash, Ithaca, Kurt M. Kosanke, Wappingers Falls, and Glenn T. Sincerbox, Poughkeepsie, N.Y., assignors to International Business Machines Corporation, New York, N.Y., a corporation of New York
Filed June 10, 1964, Ser. No. 374,011
U.S. Cl. 340—173         5 Claims
Int. Cl. G11b 7/00

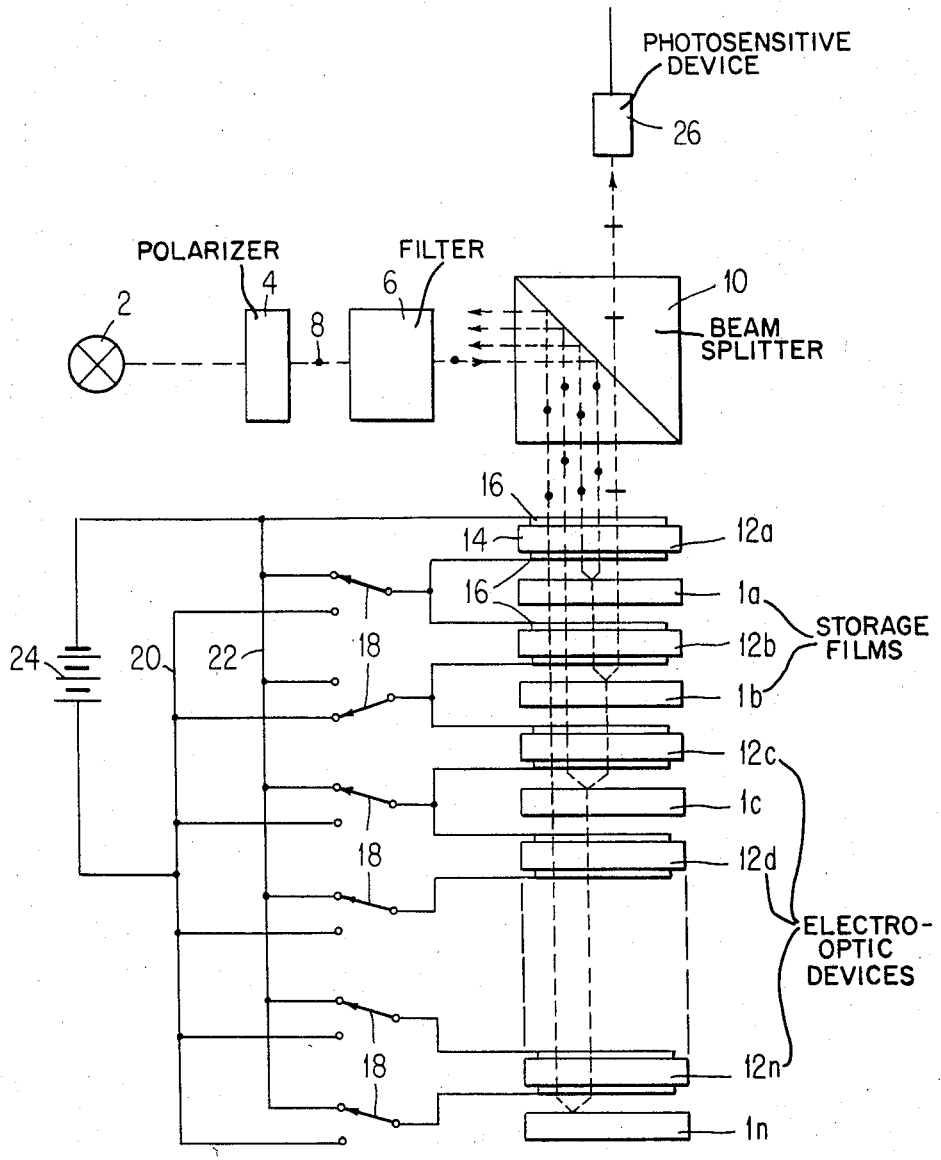

ABSTRACT OF THE DISCLOSURE

Apparatus is provided for reading information stored in a plurality of storage elements using a single light beam. The storage elements are coaxially arranged with electro-optical control devices disposed between them for acting on the interrogating light beam. When a particular storage element is to be interrogated the associated electro-optic element is activated to alter the polarization of the light reflected from the storage element causing it to traverse a desired path for detection.

---

This invention relates to apparatus for reading stored information by means of light, and more particularly to apparatus for reading information from any one of a plurality of storage elements by means of a single light beam.

Information is sometimes stored in a transparent film in the form of light reflecting layers. Such layers are formed by directing light through a photographically sensitive emulsion and reflecting the same light back through the emulsion. A standing wave is set up for each monochromatic light frequency, and the emulsion is modified at the antinodes of the standing waves so that, after processing and fixing, a plurality of light scattering layers are formed in depth in the film spaced at periodic intervals for each anharmonic frequency of information stored therein. The layers may either be of a shape representative of the information stored or be of no particular shape and represent binary information by either the presence or absence of layers for any given frequency. A film having such light reflecting layers is generally known as a Lippmann film.

When light is directed through a film in which reflecting layers had previously been formed, a coherent reflective scattering of the light is obtained if it is of the same frequency as that which resulted in the original formation of the layers. Light of other frequencies is reflected incoherently from the layers, resulting in a considerably reduced intensity relative to the coherent reflected light of a recorded anharmonic frequency. By directing light of a selected frequency through a film in which information has been recorded and noting whether or not a coherent reflected light is obtained, it can be determined if the film contained information corresponding to that frequency.

Reading of information from a film may be accomplished by directing linearly polarized light of a selected frequency through a beam splitter which passes such light in one direction or another depending on the direction of polarization. The light may pass from the beam splitter through an electro-optic device to the film and, if the film contains reflective layers corresponding to the light frequency, be partially reflected back through the electro-optic device to the beam splitter. If the electro-optic device is energized by a quarter-wave voltage, the polarization of the light is changed, in passing twice through the electro-optic device, by 90 degrees and the light follows a different path through the beam splitter to a photo-detector.

It has been discovered that a single light beam may be caused to read information from any one of a plurality of coaxially arranged films by placing an electro-optic device at the input side of each film and electrically connecting an electrode for a device at one side of each film to an electrode on the device at its opposite side. Each of these connections may be connected by a switch to one or another of two common lines which are, in turn, connected to opposite sides of a voltage source. By this arrangement, an electro-optic device at each side of a film may be energized to effect a selecting of that film for reading. Light reflected from this film is returned to the beam splitter polarized in a direction to pass through to the photo-detector. Reflected light from the other films is polarized in a direction to be deflected by the beam splitter over a different path.

An object of this invention is to provide improved means for reading information by means of light from any one of a plurality of storage devices.

Another object is to provide improved apparatus for reading from any one of a plurality of elements, by means of a single light beam, information stored therein in the form of light reflecting layers.

The foregoing and other objects, features and advantages of the present invention will be apparent from the following more particular description of the preferred embodiment of the invention as illustrated in the accompanying drawings.

In the drawings:

FIG. 1 is a schematic diagram of a system which is operable to read information selectively from any one of a plurality of storage elements by means of a single light beam.

As shown in the drawing, a plurality of elements, such as transparent films 1a, 1b, 1c . . . 1n, having information stored within them in the form of light reflecting layers, are arranged in vertical alignment. Each film may have a number of different sets of reflecting layers, those of each set being spaced from each other distances which are directly proportional to the frequency of the light which originally effected the depositing of material forming the layers. Such film is generally referred to as a Lippman film and may be formed as described in an application, Serial No. 332,755, filed December 23, 1963, by Harold Fleisher et al. and assigned to the same assignee as the assignee of this application.

When light is passed through any film at a frequency equal to that which caused the formation of reflecting layers within it, a coherent reflective scattering of light is obtained from the layers. There may be in each film a set of reflecting layers spaced periodically the same as sets of layers in other film from which information may be read. It will be appreciated that light will be reflected from all sets of layers having the same periodic spacing when light is passed through each film at a frequency corresponding to the spacing. In order to read information represented by any one of the sets of layers, it is necessary that means be provided for rendering ineffective all light reflected from other layers.

For directing light at a selected frequency through the film 1a to 1n, there is provided a light source 2 from which light at all frequencies is delivered through a polarizer 4 to a controllable filter 6 adapted to pass only light of the desired frequency. Light from the polarizer is linearly polarized in a plane perpendicular to the plane of the drawing as indicated by the dot 8, and the light at the selected frequency and the same polarization is directed from the filter 6 through a beam splitter 10 which deflects the light toward the film. At the side of each film toward the beam splitter is an electro-optic device, these devices being numbered 12a, 12b, 12c . . . 12n. Each electro-optic device includes an electro-optic crystal 14, such as a potassium dihydrogen phosphate crystal, and a pair of transparent electrodes 16 at opposite sides of the crystal. When a certain voltage is applied across the electrodes of any crystal, a plane polarized light passing through them and the crystal become circularly polarized. If this light is then reflected through the same crystal while its electrodes remain energized, the light becomes plane polarized at 90 degrees to the original beam's polarization direction. Any light passing in both directions through two energized electro-optic devices becomes linearly polarized in the same direction as that of the original light beam.

For energizing the electrodes of the electro-optic devices in a desired manner, one electrode of each electro-optic device at opposite sides of each film is electrically connected to a switch 18 which may be positioned to connect the electrodes through one or another of two common conductors 20 and 22 leading to opposite sides of a voltage source 24. The upper electrode of the electro-optic device 12a is connected through the conductor 22 directly to the voltage source. The film 1n spaced farthest from the beam splitter has only an electro-optic device 12n located at its upper side, and the electrode for this device adjacent the film may be connected through a switch 18 to either side of the voltage source 24.

With all of the switches 18 in their upper positions, all electrodes 16 are connected to the common conductor 22 and no voltage is applied across the electrodes. If light is passed under these conditions from the beam splitter through the film 1a to 1n at a frequency corresponding to that at which information is stored in any one or more of the film, then light is reflected back but at the same polarization and is deflected by the beam splitter over the same path as the original beam. Assume that it is desired to read information from the film 1b. To do this, switch 18 controlling the electrodes at opposite sides of the film is moved to its lower position, as shown in FIG. 1, for connecting the electrodes to the opposite side of the voltage source. Since the electrodes at the upper and lower sides, respectively, of crystals 12b and 12c remain connected to the original side of the voltage source, then a voltage is applied across the electrodes on crystals 12b and 12c. Light passing from the beam splitter 10 downwardly may be partially reflected back at film 1a but, if it is, it remains linearly polarized in the original plane and is deflected by the beam splitter toward the filter 6. The remaining light passes through the crystal 12b and becomes circularly polarized. If film 1b contains information corresponding to the frequency of the light, part of the light is reflected back through the crystal 12b and becomes linearly polarized at 90 degrees to the polarization direction of the original beam. This light then passes straight through the beam splitter 10 to a photosensitive device 26 which emits an electric pulse indicating that information has been read. All light not reflected back at either film 1a or 1b passes through crystal 12c and becomes linearly polarized in a plane at 90 degrees to the original direction of polarization. Any light reflected back from film below film 1b must pass again through both of the crystals 12c and 12b whose electrodes remain energized. In passing through both of these crystals again, the light becomes linearly polarized in the same direction as that of the original beam and is deflected by the beam splitter 10 toward the filter 6. At the lowermost film 1n, the switch 18 needs to control only the application of a voltage to the electro-optic device above the film since light passing beyond this film is lost. By moving only one switch to its lower position while the other switches remain in their upper positions, information may be read from any desired film. If desired, any light reflected back by the reading of stored information may be directed against a light sensitive medium for effecting a printing or displaying of the information.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for reading selectively from a plurality of transparent storage elements in axial alignment any information stored therein in the form of light reflecting layers comprising, in combination, a beam splitter arranged in axial alignment with said storage elements, means for delivering an interrogating beam of linearly polarized light at a selected frequency through said beam splitter to said storage elements, an electro-optic device positioned in the path of the interrogating beam before each of said storage elements, each of said electro-optic devices being operable when energized to change the direction of polarization of light passing therethrough by 45 degrees, and means for energizing said electro-optic devices on both sides of any one of said storage elements except the last in the axial alignment of the elements selectively for effecting a reading of information therefrom said last element having only the electro-optic device positioned before it in the path of the interrogating beam energized for accomplishing a reading of the information therefrom.

2. The apparatus of claim 1 in which each of said electro-optic devices comprises an electro-optic crystal and an electrode at each of its sides, and said means for energizing said electro-optic devices includes a switch for each of said storage elements, means for connecting each of said switches to one electrode of each of said electro-optic devices at opposite sides of the storage element with which said switch is associated, a source of potential, and means for connecting said potential source across said switches whereby an operation of the latter effects a connection of said electrodes to one side or the other of said potential source.

3. The apparatus of claim 1 in which said beam splitter operates to pass light reflected from said storage elements with a polarization direction different from that of said interrogating beam, over a different path from said interrogating beam, and means responsive to light directed over said different path for indicating the information read.

4. Information storage readout apparatus comprising, in combination, a plurality of transparent elements in which information is stored in the form of periodically spaced light reflecting layers, said layers operating to reflect light of a frequency which is proportional to their spacing, a beam splitter arranged in coaxial alignment with said elements, an electro-optic device located at the side of each of said elements toward said beam splitter, means for delivering an interrogating beam of linearly polarized light at a selected frequency through said beam splitter and said electro-optic devices to said storage elements, each of said electro-optic devices operating when energized to effect a change in the polarization direction of light passing therethrough by 45 degrees, and means for energizing said electro-optic devices on both sides of any one of said storage elements except the last in the axial alignment of the elements selectively for effecting a reading of information therefrom, said last element having only the electro-optic device positioned before it in the path of the interrogating beam energized for accomplishing a reading of the information therefrom.

5. The apparatus of claim 4 in which said last mentioned means includes, for each of said storage elements, a switch electrically connected to the electro-optic devices at both sides of said storage element,
  a source of voltage,
  said switches being operable to make connection with either one side or the other of said voltage source and acting when one of said switches makes connection with one side while the other switches make connection with the other sides for effecting a reading of said storage element associated with said one switch.

References Cited

UNITED STATES PATENTS

| | | | |
|---|---|---|---|
| 3,067,413 | 12/1962 | Fischle | 350—150 X |
| 3,083,262 | 3/1963 | Hanlet | 350—150 X |
| 3,348,217 | 10/1967 | Snaper | 350—150 X |

MAYNARD R. WILBUR, *Primary Examiner.*

J. I. SCHNEIDER, *Assistant Examiner.*

U.S. Cl. X.R.

235—61.115; 350—150